(12) United States Patent
Hickman

(10) Patent No.: US 6,400,590 B2
(45) Date of Patent: Jun. 4, 2002

(54) REGULATED RESONANT CONVERTER

(75) Inventor: Kevin Hickman, Witney (GB)

(73) Assignee: Oxford Magnet Technology Limited, Oxford (GB)

(*) Notice: Subject to any disclaimer, the term of this patent is extended or adjusted under 35 U.S.C. 154(b) by 0 days.

(21) Appl. No.: 09/779,707

(22) Filed: Feb. 9, 2001

(30) Foreign Application Priority Data

Feb. 11, 2000 (GB) .............................. 0003055
Sep. 13, 2000 (GB) .............................. 0022363

(51) Int. Cl.[7] .......................... H02M 7/00; H02M 3/335
(52) U.S. Cl. ............................. 363/65; 363/17; 363/98
(58) Field of Search ......................... 363/65, 37, 98, 363/17, 15, 16, 80, 68

(56) References Cited

U.S. PATENT DOCUMENTS

| | | | | |
|---|---|---|---|---|
| 3,953,779 A | * | 4/1976 | Schwarz | 363/28 |
| 4,694,383 A | * | 9/1987 | Nguyen et al. | 363/17 |
| 5,075,836 A | * | 12/1991 | Suzuki et al. | 363/17 |
| 5,625,538 A | * | 4/1997 | Lee et al. | 363/15 |
| 5,712,533 A | * | 1/1998 | Corti | 315/169.3 |
| 5,880,944 A | * | 3/1999 | Hickman | 363/65 |

FOREIGN PATENT DOCUMENTS

| | | |
|---|---|---|
| GB | 2163013 | 2/1986 |
| GB | 2311387 | 9/1997 |
| GB | 2311422 | 9/1997 |
| WO | 00/30408 | 5/2000 |

* cited by examiner

*Primary Examiner*—Rajnikant B. Patel
(74) *Attorney, Agent, or Firm*—Crowell & Moring LLP (57) ABSTRACT

There is disclosed a parallel loaded series resonant converter 300 suitable for supplying DC to a three axis gradient amplifier in an MRI system. In conventional resonant circuits, output voltage is regulated by controlling the switching frequency of an H-bridge or half bridge switching arrangement and the resonant circuit (334, 335) is under more stress at no load than at full load. The voltage across the resonant capacitor (334) is a function of the switching frequency, the load and the voltage applied across the resonant circuit ($V_A - V_B$). In the present invention, the peak current at no load is reduced to lower than the peak current at full load by controlling the voltage applied to the resonant circuit ($V_A - V_B$) rather than controlling the switching frequency.

19 Claims, 6 Drawing Sheets

REGULATED RESONANT CONVERTER

BACKGROUND OF THE INVENTION

The present invention relates to a regulated resonant converter. In particular to a series resonant converter for providing a direct current (DC) power supply to electromagnets.

Regulated resonant converters are well known and are used to convert an alternating current (AC) mains supply to a regulated source of electrical energy. Regulated resonant converters are widely used for various applications, for example battery chargers, induction heating and power supply to electromagnets. The following discussion is especially, although not exclusively, concerned with the use of resonant power converters in magnetic resonant imaging (MRI) systems, for providing controlled electrical energy to gradient coils for the purpose of modifying the magnetic field of an MRI magnet as required for imaging. Each is resonant converter functions as a DC electricity supply for a three-axis gradient amplifier whose output is in turn applied to the gradient coils. UK Patent Application GB-A-2311387 discloses a regulated resonant converter in an MRI system and is included herein by reference.

Known regulated resonant converters comprise a series resonant circuit through which current is switched alternately in opposite directions at a frequency which corresponds to, or which is close to, the resonant frequency of the series resonant circuit, by an arrangement of switching transistors fed via a rectifier from an AC mains supply. In this way, higher frequency perturbations are strongly attenuated. Operation of the switching transistors is controlled by signals generated in a control circuit in dependence upon a fed-back sample of an output voltage from the converter which is developed in the resonant circuit, and a crossover voltage derived in dependence upon current reversal in an inductor, which forms a part of the resonant circuit, regulation being effected in dependence upon modification of the fed-back sample.

A typical parallel loaded series resonant converter for an MRI system converts the input from a 50 Hz three-phase source of 400 V AC (or a 60 Hz source at 480 V AC) into six isolated outputs at 400 V DC. The load applied in parallel across a capacitor component of the resonant circuit can vary from zero to 25 kW.

The transistor switches used are typically insulated gate bipolar transistors (IGBT) but may also be power transistors or a gate turn-off thyristors.

Conventionally, the output voltage is regulated by controlling the switching frequency in a bridge arrangement of transistors, for example a half-bridge, having two switches, or an H-bridge, which has four switches. At peak line voltage and minimum load, the peak current in the switches and in the resonant inductor is at a maximum and power is lost as a result. The bridge arrangement and the resonant circuit are stressed more in the absence of a load than at full load.

It is therefore an object of the invention to obviate or at least mitigate the aforementioned problems.

SUMMARY OF THE INVENTION

In accordance with one aspect of the present invention, there is provided a method for regulating the output voltage of a resonant power converter, including the steps of:

a) providing current to a resonant circuit through a switching arrangement having a plurality of switches, the switches governing an alternating flow of current through the resonant circuit;

b) providing a feedback signal; and c) controlling the behaviour of the switches in accordance with the feedback signal in order to vary the duration over which current passes through the resonant circuit.

The method preferably further includes the steps of:

d) detecting a current reversal event; and e) generating a crossover signal corresponding to the current reversal event.

Advantageously, step c) corresponds to varying the voltage drop across the resonant circuit.

It is preferred that the switching arrangement comprises an H-bridge including: a first switch, a second switch, a third switch and a fourth switch; the first switch being disposed in series with the third switch and the second switch being disposed in series with the fourth switch, a first junction being provided between the first switch and the third switch and a second junction being provided between the second switch and the fourth switch, and the resonant circuit being disposed between the first junction and the second junction.

Step c) may comprise the generation of a repeating cycle of switching signals.

Preferably, the generation of a repeating cycle comprises the substeps of: providing the first switch with a first switching signal having a first ON-time of fixed duration, a first onset time, $t_0$ and a first end time, $t_2$; providing the second switch with a second switching signal having a second ON-time of fixed duration, a second onset time, $t_3$ and a second end time, $t_5$; providing the third switch with a third switching signal having a third ON-time of variable duration, the third ON-time beginning at the second onset time, $t_3$ and ending at a third end time, $t_4$; and providing the fourth switch with a fourth switching signal having a fourth ON-time of variable duration, the fourth ON-time beginning at the first onset time, $t_0$ and ending at a fourth end time, $t_1$.

The first ON-time and the second ON-time may have substantially the same fixed duration.

The third ON-time and the fourth ON-time may also have substantially the same variable duration within each repeating cycle of switching pulses.

Step c) can be achieved by varying the third end time, $t_4$, of the third witching signal and the fourth end time, $t_1$, of the fourth switching signal in accordance with the feedback signal.

In accordance with a further aspect of the present invention, there is provided a power converter apparatus for supplying a regulated output voltage, including: a resonant circuit; a switching arrangement having a plurality of switches and governing the direction and duration of flow of current through the resonant circuit; a feedback means for supplying a feedback signal; and a control circuit which controls the behaviour of the switches in the switching arrangement in accordance with the feedback signal; characterised in that the control circuit controls the switching arrangement by varying the duration over which current passes through the resonant circuit in accordance with the feedback signal.

The apparatus advantageously further includes a crossover detection means for detecting current reversal events in the resonant circuit and generating a crossover signal corresponding to detected current reversal events, the control circuit using the crossover signal to transmit a corresponding switching signal to at least one of the switches in the switching arrangement.

Preferably, the crossover detection means includes a current transformer comprising a secondary circuit coupled to the resonant circuit and each current reversal event in the resonant circuit induces a corresponding current reversal event in the secondary circuit.

It is preferred that the resonant circuit includes a capacitor and a first inductor in series, the first inductor connected to a first side of the capacitor.

BRIEF DESCRIPTION ON THE DRAWING

The resonant circuit may further include a second inductor connected in series to the side of the capacitor opposite to the first side.

Advantageously, the feedback signal corresponds to an output voltage measured across the capacitor.

The switching arrangement preferably comprises an H-bridge arrangement.

The H-bridge may include a first switch, a second switch, a third switch and a fourth switch, the first switch being disposed in series via a first junction with the third switch, the second switch being disposed in series via a second junction with the fourth switch and the resonant circuit being disposed between the first junction and the second junction.

Advantageously, the control circuit controls the H-bridge by addressing each of the four switches independently with a corresponding switching signal.

It is preferred that a first switching signal addressing the first switch and a second switching signal addressing the second switch both have a fixed duration $T_F$.

Likewise a third switching signal addressing the third switch and a fourth switching signal addressing the fourth switch preferably both have a duration $T_V$ that varies in accordance with the feedback signal.

The voltage, $V_C$, across the resonant capacitor, $C_R$, is a function not only of the switching frequency but also of the load and the voltage applied across the resonant circuit $(V_A-V_B)$. Therefore, by controlling the voltage applied to the resonant circuit $(V_A-V_B)$ rather than the frequency, the peak current at no load can be reduced to a level lower than the peak current at full load. Variation in the ON-times of the switching arrangement provides the control circuit with the necessary control over the level of voltage drop $(V_A-V_B)$.

DETAILED DESCRIPTION OF THE INVENTION

For a better understanding of the present invention, reference will now be made, by way of example only, to the accompanying drawings in which.

Figure 1:
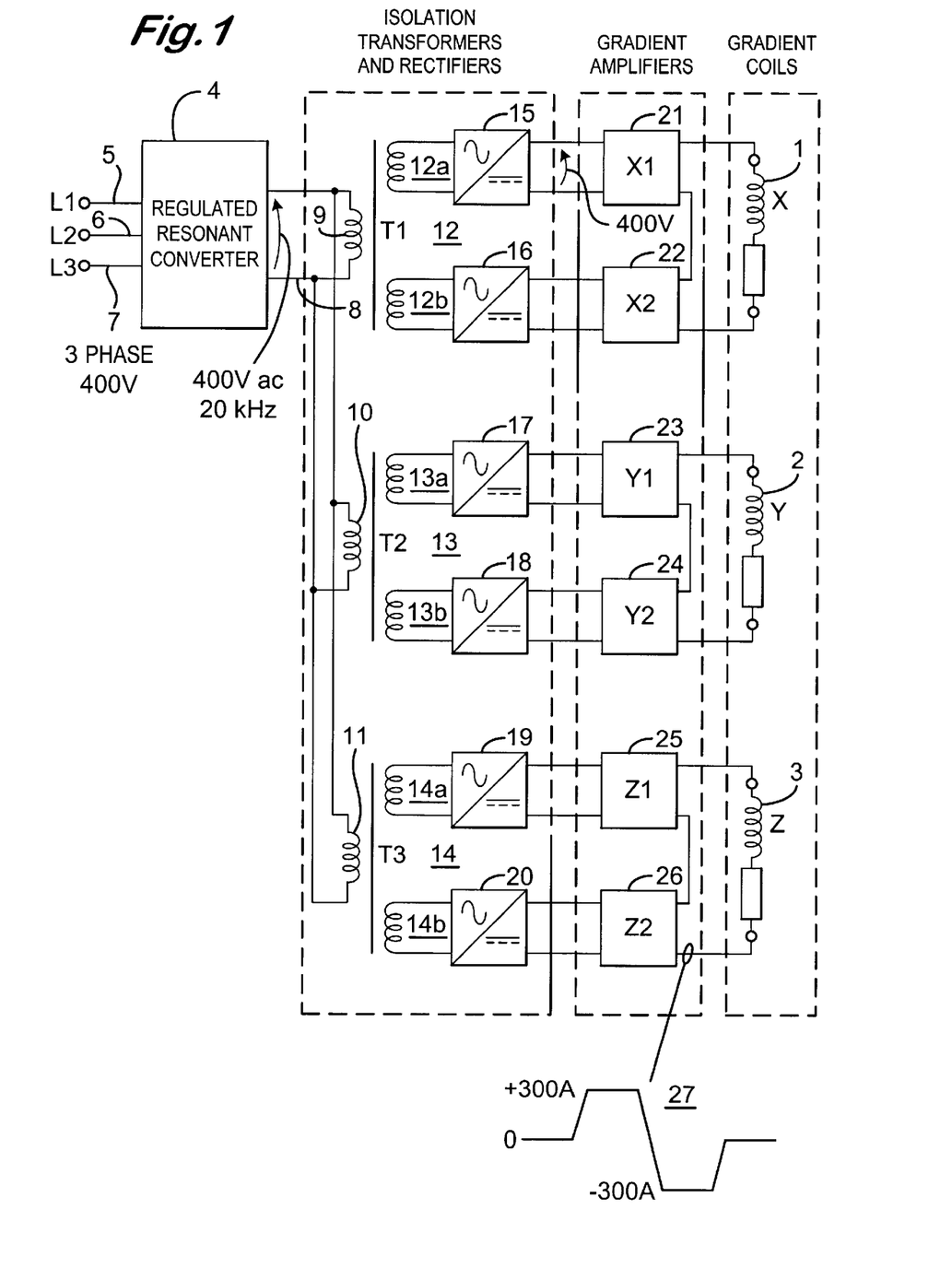
FIG. 1 shows a schematic circuit diagram of an arrangement using a resonance converter to energise the gradient coils of an MRI system.

FIG. 1 illustrates a typical circuit arrangement for energising X, Y and Z gradient coils 1, 2, 3 of an MRI system (not shown). A regulated resonant converter 4 is fed from three terminals 5, 6, 7 of a three-phase, 400 V, 50 Hz AC supply. On output lines 8, the regulated resonant converter 4 provides a single phase 400 V AC supply at a frequency of approximately 20 kHz. The 400 V AC 20 kHz supply is fed to three primary windings 9, 10, 11 of three transformers 12, 13, 14 respectively, which serve for isolation purposes. Secondary windings 12a, 12b, 13a, 13b, 14a, 14b of the three transformers 12, 13, 14 respectively are arranged to feed rectifiers 15, 16, 17, 18, 19, 20 as shown, to produce a 400 V DC supply for gradient amplifiers 21, 22, 23, 24, 25, 26 respectively. In order to provide the required rate of change of current in the gradient coils 1, 2, 3, the gradient amplifiers are connected in pairs so that gradient amplifiers 21 and 22 feed the gradient coil 1, gradient amplifiers 23 and 24 feed the gradient coil 2 and gradient amplifiers 25 and 26 feed the gradient coil 3.

In operation, the gradient amplifiers 21 to 26 are switched to produce a waveform in 27 (as shown inset) in each of the gradient coils 1, 2, 3, so as to produce appropriate modification of the magnetic field produced by the magnet of an MRI system as required for imaging. The principles of operation of the magnet, the MRI system and the imaging system are well known to those skilled in the art, and are not central to the present invention. Accordingly, they will not be described in detail herein.

Figure 2:
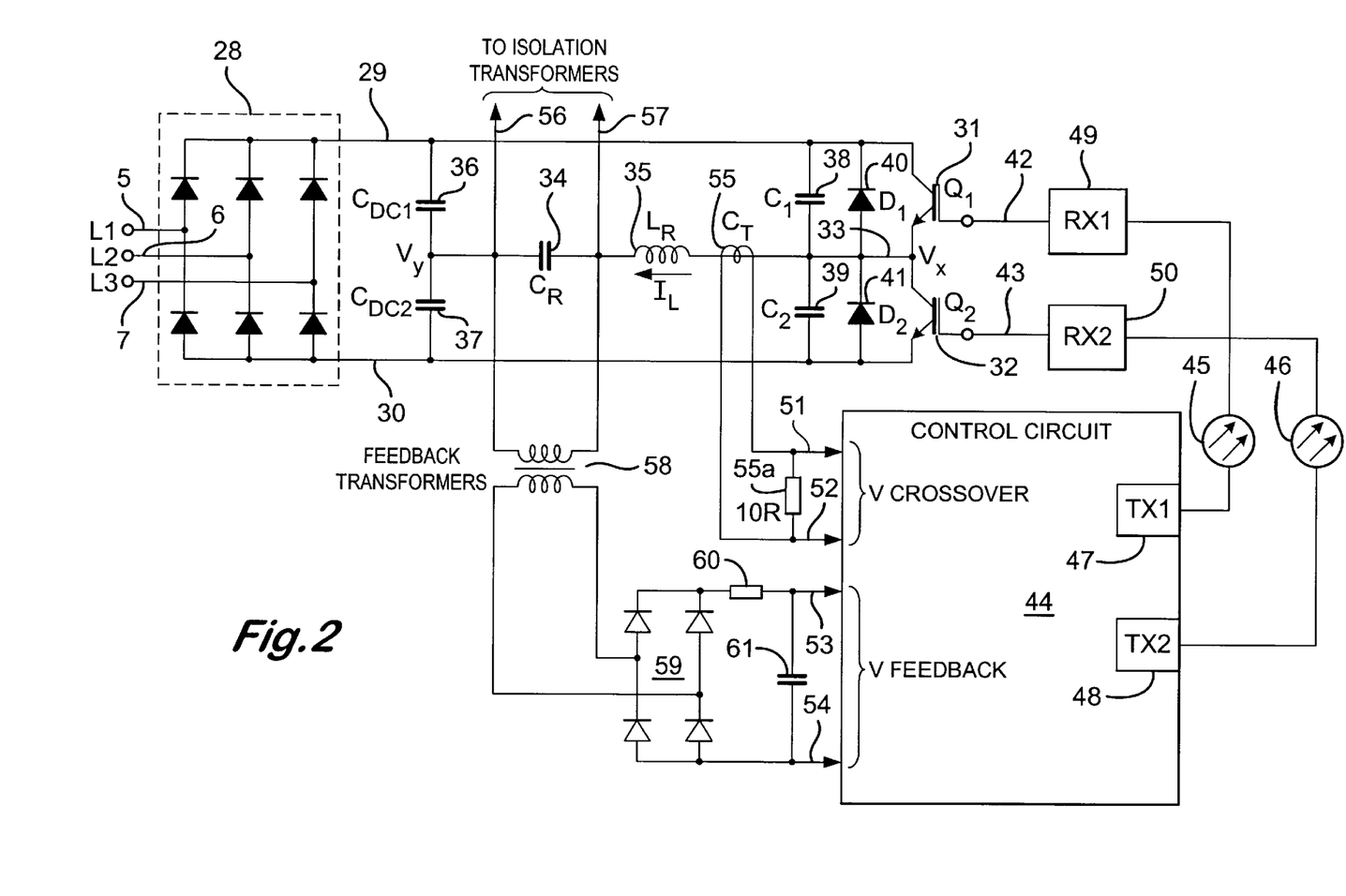
FIG. 2 shows a schematic circuit diagram of a regulated resonance converter as disclosed in UK Patent Application GB-A-2311387.

Referring now to FIG. 2, wherein a known regulated resonant converter 4 is shown in greater detail, the three-phase input lines 5, 6 and 7 are arranged to feed a rectifier 28 (as shown within broken line) thereby to provide between lines 29 and 30 a DC voltage which is applied to a pair of serially connected switching transistors 31 and 32, in an arrangement known as a half-bridge. A junction 33 between the switching transistors 31 and 32 is coupled via a series resonant circuit comprising a capacitor 34 and an inductor 35 to a junction between two capacitors 36 and 37 which are serially connected between the DC supply lines 29 and 30. The transistors 31 and 32 are shunted by snubber capacitors 38 and 39 which are serially connected and coupled at a junction therebetween to the junction 33 between the transistors 31 and 32. The snubber capacitors 38 and 39 are arranged to be shunted by diodes 40 and 41 respectively.

The transistors 31 and 32 in operation are switched by signals applied to their respective gate terminals via lines 42 and 43 respectively. The signals for switching the transistors 31 and 32 are derived in a control circuit 44 which is coupled via optical links 45 and 46 (shown schematically) to the transistors 31 and 32. Optical links here serve the same purpose as the transformers in FIG. 1; they isolate the power converter circuit. Optical signals are generated within the control circuit 44 in transmitters 47 and 48 and converted to corresponding electrical signals in receivers 49 and 50 which feed the transistors 31 and 32 respectively. Switching is effected by the control circuit 44 in dependence upon a crossover voltage applied to the control circuit 44 via lines 51 and 52, and a feedback voltage which is fed to the control circuit 44 via lines 53 and 54.

The crossover voltage is derived via a coupling transducer 55 from the line 33 and the feedback voltage comprises, in effect, a sample of an output voltage from the regulated resonant converter which is developed between lines 56 and 57 across the capacitor 34 which forms a part of the resonant circuit, the sample being fed via a feedback transformer 58 and a bridge rectifier 59 to provide a DC signal level on the lines 53 and 54 which is smoothed by a resistor 60 and a capacitor 61 to provide the feedback voltage.

Figure 3:
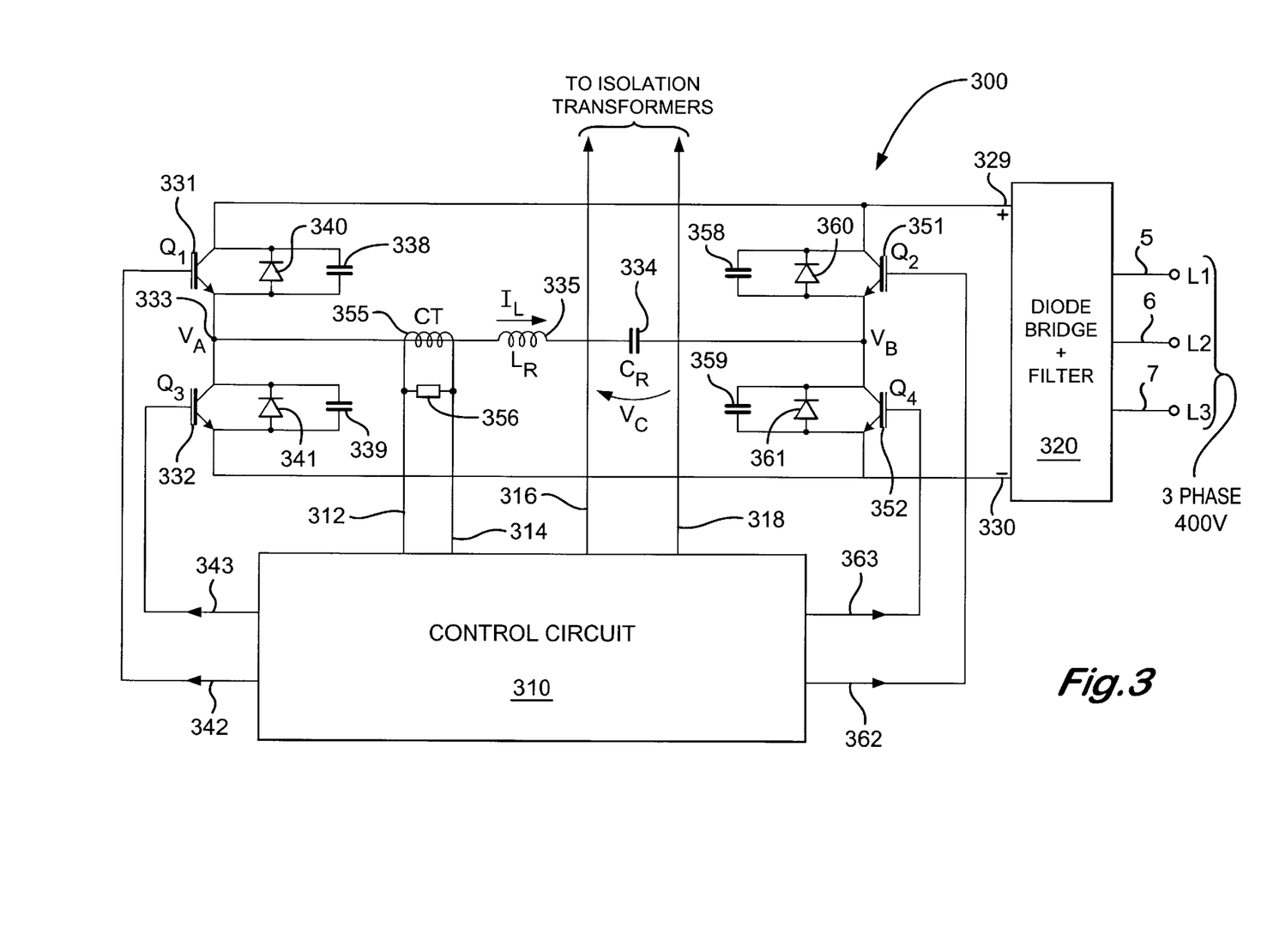
FIG. 3 shows a schematic circuit diagram of a regulated resonance converter which may be controlled according to the present invention.

The circuit shown in FIG. 3 shares many of the features of the prior art resonant converter in FIG. 2. The resonant converter 300 in FIG. 3 can be implemented as the regulated resonant converter 4 of FIG. 1.

FIG. 3 shows a schematic circuit for a resonant converter 300 for connection to a three-phase source of 400 V AC at 50 Hz. It will be understood that the same circuit can be arranged for connection to an alternative three-phase source of 480 V AC at 60 Hz, or more generally sources at values in the range 360 V to 528 V, with little alteration. Input lines 5, 6 and 7 are arranged to feed a diode bridge and filter circuit 320. The outputs of the diode bridge and filter circuit 320 provide a DC voltage between lines 329 and 330 which is applied to a first serially connected pair (Q1, Q3) 331, 332 and a second serially connected pair (Q2, Q4) 351, 352 of switching transistors, in an arrangement known as an H-bridge or full-bridge, the first pair 331, 332 being in parallel with the second pair 351, 352.

A junction 333 between the first pair of switching transistors (Q1, Q3) 331 and 332 is coupled via a series resonant circuit comprising a capacitor 334 and an inductor 335 to a junction 353 between the second pair of switching transistors (Q2, Q4) 351 and 352. Each of the switching transistors 331, 332, 351, 352 is arranged in parallel with a respective snubber capacitor 338, 339, 358, 359. The snubber capacitors 338, 339, 358, 359 are arranged to be shunted by diodes 340, 341, 360, 361 respectively.

The switching transistors 331, 332, 351, 352 are switched by signals applied to their respective gate terminals via lines 342, 343, 362, 363 respectively. The signals for switching the transistors 331, 332, 351, 352 are derived in a control circuit 310. All the switching transistors Q1, Q2, Q3, Q4, turn on when there is zero current through them and while there is zero voltage across them.

Switching is effected by the control circuit 310 in dependence upon a crossover voltage applied to the control circuit 310 via lines 312 and 314, and a feedback voltage which is fed to the control circuit 310 via lines 316 and 318. The crossover voltage is derived via a coupling transducer 355 from the line between junctions 333 and 353. The feedback voltage comprises a sample of an output voltage from the regulated resonant converter which is developed between lines 316 and 318 across the capacitor $C_R$ 334 which forms a part of the resonant circuit.

Figure 4:
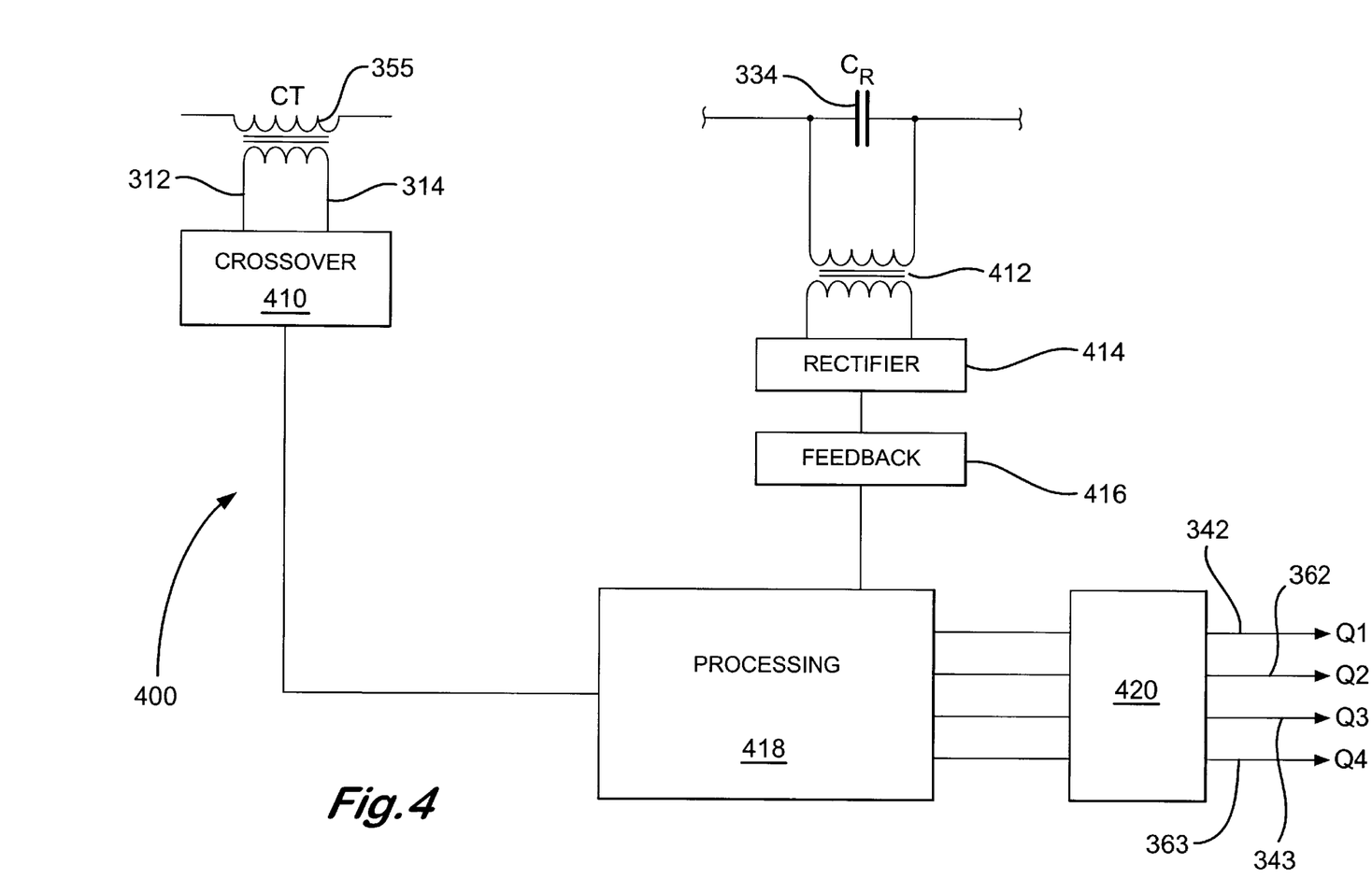
FIG. 4 shows the control circuit of the regulated resonance converter in FIG. 3 in more detail.

FIG. 4 illustrates the control circuit 310 of FIG. 3 in more detail. The sample of output voltage developed across capacitor $C_R$ 334 is fed via a feedback transformer 412 and a bridge rectifier 414 to provide a DC signal level to a feedback circuit 416. Likewise the voltage sensed through the current transformer CT 355 along the lines 312 and 314 is provided to a crossover circuit 410. Using the fed-back voltage level from the feedback circuit 416 and the crossover detection of the crossover circuit 410, the processing means 418 is arranged to provide signals 342, 362, 343, 363 for controlling the switching transistors Q1, Q2, Q3 and Q4 respectively. As in FIG. 2, the control signals are insulated by an intervening optical apparatus 420.

In conventional operation, an H-bridge arrangement of four switches is controlled so that the switching frequency is varied according to the output voltage feedback levels. Using the H-bridge in FIG. 3 as an example, switch Q1 and switch Q4 are arranged to operate in tandem. Both switches switch to the ON state simultaneously and remain in the ON state for the same duration, the "ON-time". Likewise the ON-times and the onset of the ON state of switches Q2 and Q3 are respectively identical and simultaneous. By varying the switching frequency, the output voltage level can be regulated.

Figure 5:
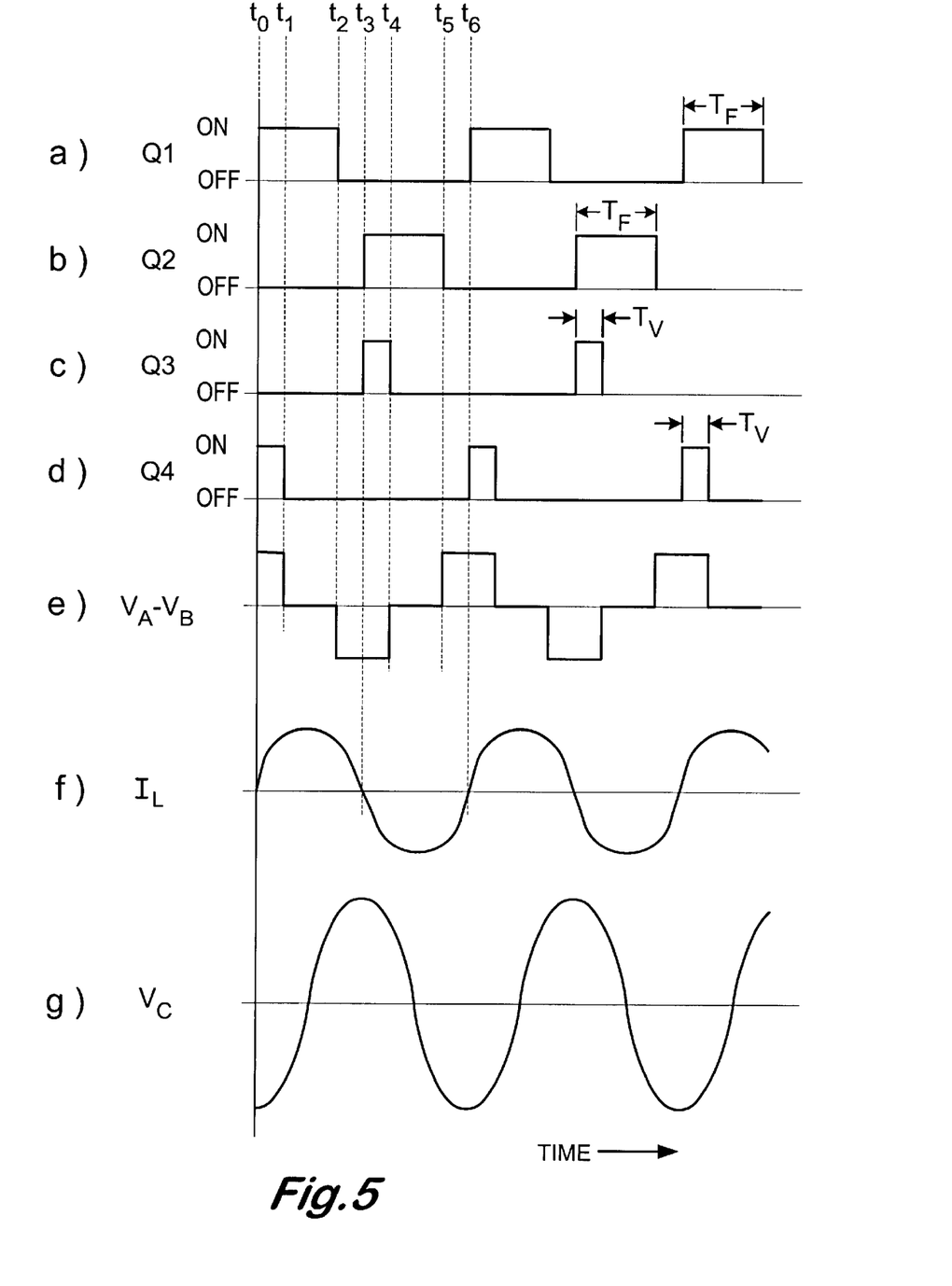
FIG. 5 shows a timeline diagram comparing the states of the switches to the resulting voltage output.

FIG. 5 illustrates the operation of a resonant converter according to the present invention, when implemented in the circuit of FIG. 3.

In one embodiment of the present invention, Q1 and Q2 each have an ON-time of the same fixed duration, $T_F$. It will be understood that the actual ON-time is set by a potentiometer and depends upon the desired output voltage level. By modulating the pot, the ON-times of Q1 and Q2 can differ. In contrast, the length of time for which Q3 and Q4 remain ON, $T_V$, is arranged to be variable yet within the duration of the Q1 and Q2 ON-time respectively: that is, $T_V \leq T_F$. As for Q1 and Q2, the ON-time $T_V$ is substantially the same for both Q3 and Q4; strictly speaking the variable ON-time $T_V$ does vary between Q3 and Q4 ON-times within a single cycle but the variation within a cycle is negligible. Here the ON-times are governed by feedback from the output voltage level but crucially the switching frequency may stay unchanged. It will be understood that both switching frequency and ON-times for switches Q3 and Q4 can be varied simultaneously. Simultaneous variation is particularly desirable when a low output voltage is required.

The pulse trains a)–d) in FIG. 5 correspond to the switching signal passed to switches Q1–Q4 respectively. A first half-cycle is governed by switches Q1 and Q4. At time $t_0$, both Q1 and Q4 are switched ON. After being in the ON state for a variable duration $T_V$, the signal to switch Q4 goes OFF at time $t_1$. The signal to switch Q1 goes OFF at time $t_2$ some time later. During the first half-cycle, the signals to switches Q2 and Q3 remain OFF. As a result, throughout the period between $t_0$ and $t_1$, current can pass along line 329, across switch Q1 331 to junction 333, through the inductor $L_R$ 335 and capacitor $C_R$ 334 of the resonant circuit to the junction 353, over switch Q4 352 and back along line 330—the voltage drop between junctions 333 and 353 ($V_A-V_B$) is positive as can be seen from pulse train e). During the period between $t_1$ and $t_2$ only switch Q1 is ON and the voltage drop ($V_A-V_B$) returns to zero.

Between times $t_2$ and $t_3$, none of the switches is ON but the voltage drop becomes negative as the capacitor 334 of the resonant circuit discharges. The current, $I_L$, in the inductor $L_R$ 335 is shown as the waveform f) in FIG. 5. Inductor current, $I_L$, lags behind the voltage drop across the resonant circuit by 90°.

As the inductor current, $I_L$, reverses, the current transformer CT 355 detects a sign change and communicates the crossover event to the crossover circuit. On detection of the crossover, the control circuit sets both signals to switches Q2 and Q3 to ON, $t_3$: a second half-cycle, governed by switches Q2 and Q3 begins. Current now passes through the resonant circuit in the opposite direction to the first half-cycle, running through switch Q2 from junction 353 to junction 333 and back along line 330 via switch Q3. At time $t_4$ the control signal to switch Q3 goes OFF. The voltage drop across the resonant circuit ($V_A-V_B$) returns to zero. The fixed duration, $T_F$, of the ON-time of switch Q2 ends at time $t_5$ and the capacitor $C_R$ 334 is free to discharge. Again the crossover event in the inductor current defines the time at which the first half-cycle of a new cycle begins, $t_6$.

The variable length of the ON-times, $T_V$, is governed by feedback of the voltage, $V_C$, across the capacitor $C_R$ 334. In other words, times $t_1$, and $t_4$ are governed by the output voltage level. The output voltage has a waveform as illustrated by g) in FIG. 5. The effect of increasing the ON-time of Q3 and Q4 is to increase the voltage applied across the resonant circuit ($V_A-V_B$), between junctions 333 and 353. In this way the voltage $V_C$ is regulated.

Figure 6A:
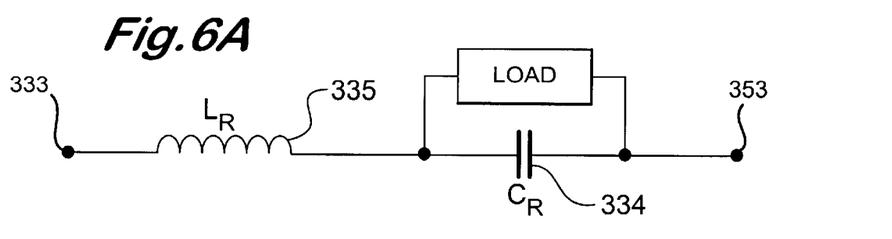
FIGS. 6A and 6B show alternative arrangements of the resonant circuit which can be used with the present invention.
Figure 6B:
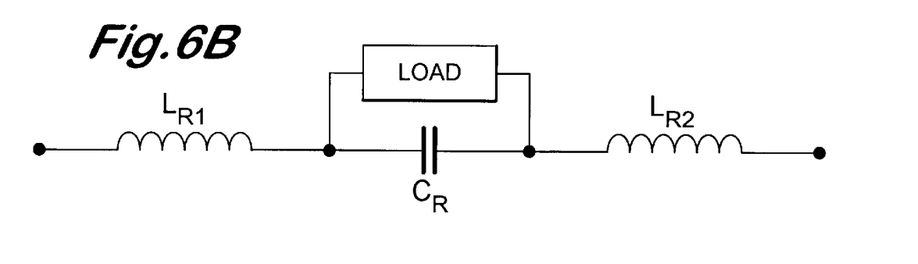

It will be understood that a resonant circuit can be constructed from many more passive components than are present the schematic circuit in FIG. 3. The only essential being an inductor in series with the remaining components of the resonant network. FIG. 6A shows only the resonant circuit components of the device in FIG. 3, a capacitor $C_R$ 334 and an inductor $L_R$ 335. A preferred alternative arrangement has two identical inductors and a capacitor in series, one inductor disposed on either side of a capacitor as illustrated in FIG. 6B. A resonant circuit with a first inductor $L_{R1}$, a capacitor $C_R$ and a second inductor $L_{R2}$ in series can even out the voltage to earth behaviour of the resonant circuit over a switching cycle. Similar resonant circuits having non-identical first and second inductors are also possible.

Figure 7A:
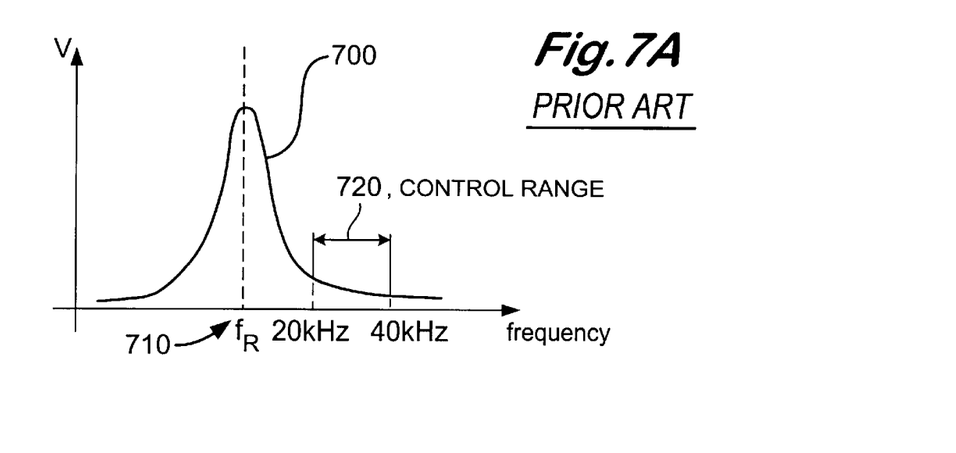
FIGS. 7A and 7B compare the resonance curves produced by the resonance circuit using known and inventive control methods.

Finally, the nature of the control methods of the present invention is illustrated in diagrams of the resonance curves associated with the resonant circuit. The conventional control method allows the switching frequency to be altered which corresponds to variation in the x-direction in FIG. 7A. For illustrative purposes only, FIG. 7A shows a typical resonant curve 700 and the range over which switching frequency is varied 720 (typical values of the control frequency range, 20–40 kHz are given; the resonant frequency, $f_R$, 710 is somewhat lower).

Figure 7B:
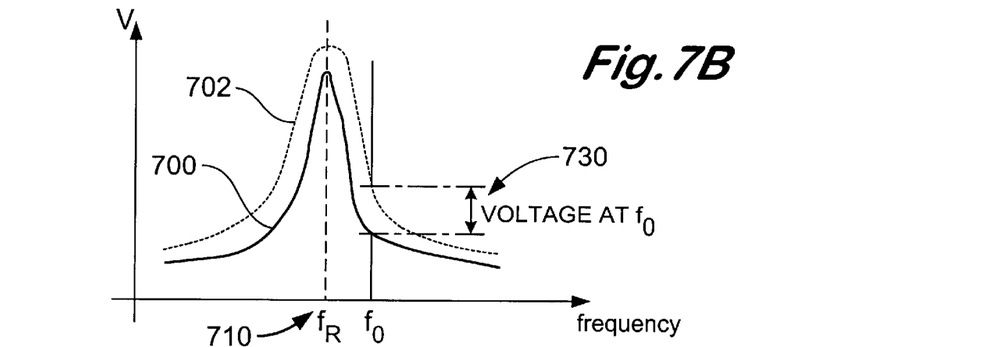

The method according to the present invention permits variation of the voltage across the resonant circuit. The inventive method allows variation of the voltage at a particular switching frequency corresponding to a variation in the y-direction as illustrated in FIG. 7B. The Figure shows more than one resonant curve 700, 702 which define the range 730 over which the voltage drop across the resonant circuit is varied.

When a high load is placed in parallel with the capacitor 334 of the resonant circuit 300, relatively more current is drawn, thereby dampening the amplitude of the peak in the resonance curve. However the opposite effect is observed when the load is very small or zero: little current is drawn by the load and the resonance peak is very large. To maintain a constant voltage output level, using the conventional frequency variation method, results in significant increases in switching frequency. The increase in switching frequency in turn results in large peak values for the inductor current, $I_L$.

The inventive method avoids the large inductor current values by altering the voltage drop across the resonant circuit.

It will be immediately obvious to a person skilled in the art that a regulated resonant converter according to the invention can be implemented in a range of devices including power supply devices for electromagnets, induction heating equipment and battery chargers.

Furthermore it will readily be seen that further conventional components can be introduced in the circuit of the invention without detracting from the inventive effect, so for example, a further capacitor (not shown) may be included between the junctions 333 and 353 for the purposes of AC coupling.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for regulating the output voltage of a resonant power converter, including the steps of:
    a) providing current to a resonant circuit through a switching arrangement having a plurality of switches, the switches governing an alternating flow of current through the resonant circuit;
    b) providing a feedback signal; and
    c) varying a voltage drop across the resonant circuit by controlling the behavior of the switches in accordance with the feedback signal in order to vary the duration over which current passes through the resonant circuit.

2. A method according to claim 1, further including the steps:
    d) detecting a current reversal event; and
    e) generating a crossover signal corresponding to the current reversal event.

3. A method according to claim 1, wherein the switching arrangement comprises an H-bridge including: a first switch, a second switch, a third switch and a fourth switch; the first switch being disposed in series with the third switch and the second switch being disposed in series with the fourth switch, a first junction being provided between the first switch and the third switch and a second junction being provided between the second switch and the fourth switch, and the resonant circuit being disposed between the first junction and the second junction.

4. A method according to claim 3, wherein step c) further includes the generation of a repeating cycle of switching signals.

5. A method according to claim 4, wherein the generation of a repeating cycle comprises the substeps of:
    i) providing the first switch with a first switching signal having a first ON-time of fixed duration, a first onset time, $t_0$ and a first end time, $t_2$;
    ii) providing the second switch with a second switching signal having a second ON-time of fixed duration, a second onset time, $t_3$ and a second end time, $t_5$;
    iii) providing the third switch with a third switching signal having a third ON-time of variable duration, the third ON-time beginning at the second onset time, $t_3$ and ending at a third end time, $t_4$; and
    iv) providing the fourth switch with a fourth switching signal having a fourth ON-time of variable duration, the fourth ON-time beginning at the first onset time, $t_0$ and ending at a fourth end time, $t_1$.

6. A method according to claim 5, wherein the first ON-time and the second ON-time have substantially the same fixed duration.

7. A method according to claim 5, wherein the third ON-time and the fourth ON-time having substantially the same variable duration within each repeating cycle of switching pulses.

8. A method according to claim 5, wherein step c) comprises varying the third end time, $t_4$, of the third switching signal and the fourth end time, $t_1$, of the fourth switching signal in accordance with the feedback signal.

9. A power converter apparatus for supplying a regulated output voltage, including:
    a resonant circuit;
    a switching arrangement having a plurality of switches and governing the direction and duration of flow of current through the resonant circuit;
    a feedback means for supplying a feedback signal; and
    a control circuit which controls the behavior of the switches in the switching arrangement in accordance with the feedback signal;

characterized in that the control circuit controls the switching arrangement to vary the voltage drop across the resonant circuit by varying the duration over which current passes through the resonant circuit in accordance with the feedback signal.

10. An apparatus according to claim 9, further including a crossover detection means for detecting current reversal events in the resonant circuit and generating a crossover signal corresponding to detected current reversal events, the control circuit using the crossover signal to transmit a corresponding switching signal to at least one of the switches in the switching arrangement.

11. An apparatus according to claim 10, wherein the crossover detection means includes a current transformer comprising a secondary circuit coupled to the resonant circuit and each current reversal event in the resonant circuit induces a corresponding current reversal event in the secondary circuit.

12. An apparatus according to claim 11, wherein the resonant circuit includes a capacitor and a first inductor in series, the first inductor connected to a first side of the capacitor.

13. An apparatus according to claim 12, wherein the resonant circuit includes a second inductor connected in series to the side of the capacitor opposite to the first side.

14. An apparatus according to claim 12, wherein the feedback signal corresponds to an output voltage measured across the capacitor.

15. An apparatus according to claim 9, wherein the switching arrangement comprises an H-bridge arrangement.

16. An apparatus according to claim 15, wherein the H-bridge includes a first switch, a second switch, a third switch and a fourth switch, the first switch being disposed in series via a first junction with the third switch, the second switch being disposed in series via a second junction with the fourth switch and the resonant circuit being disposed between the first junction and the second junction.

17. An apparatus according to claim 16, wherein the control circuit controls the H-bridge by addressing each of the four switches independently with a corresponding switching signal.

18. An apparatus according to claim 17, wherein a first switching signal addressing the first switch and a second switching signal addressing the second switch both have a fixed duration $T_F$.

19. An apparatus according to claim 18, wherein a third switching signal addressing the third switch and a fourth switching signal addressing the fourth switch both have a duration $T_V$ that varies in accordance with the feedback signal.

* * * * *